(12) United States Patent
Rocchi et al.

(10) Patent No.: US 12,384,361 B2
(45) Date of Patent: Aug. 12, 2025

(54) SYSTEMS AND TECHNIQUES FOR IMPROVED AUTONOMOUS VEHICLE COMFORT AND OPERATION

(71) Applicant: GM Cruise Holdings LLC, San Francisco, CA (US)

(72) Inventors: Alessio Rocchi, San Lorenzo, CA (US); Chingiz Tairbekov, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 305 days.

(21) Appl. No.: 17/990,260

(22) Filed: Nov. 18, 2022

(65) Prior Publication Data

US 2024/0166197 A1    May 23, 2024

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0953* (2013.01); *B60W 30/0956* (2013.01);
(Continued)

(58) Field of Classification Search
CPC ............. B60W 30/09; B60W 30/0953; B60W 30/0956; B60W 30/143; B60W 50/06; B60W 2420/408; B60W 10/04; B60W 10/18; B60W 10/20; B60W 2420/403; B60W 2420/54; B60W 30/16; B60W 30/146; G08G 1/166; G05D 1/0061; G05D 1/0088; G05D 1/021; G05D 1/0214; G05D 1/0221; G05D 1/0223
(Continued)

(56) References Cited

U.S. PATENT DOCUMENTS 11,126,180 B1 *  9/2021  Kobilarov ....... B60W 30/18163
11,577,741 B1 *  2/2023  Reschka .......... B60W 30/0953
(Continued)

OTHER PUBLICATIONS

Shane Gilroy et al., Overcoming Occlusion in the Automotive Environment—A Review, Jan. 2021, IEEE vol. 22, No. 1, pp. 23-35.*

(Continued)

*Primary Examiner* — Manglesh M Patel
(74) *Attorney, Agent, or Firm* — CANTOR COLBURN LLP

(57) ABSTRACT

Systems and techniques include functionality for improving a comfort, safety, and/or operation of an autonomous vehicle (AV) in an environment including a potential occlusion. An example method can include determining, by a computer of an AV and based on a first trajectory of an occluded hypothetical object, a dissipation boundary associated with the AV. The dissipation boundary includes a location where the AV is predicted to perceive the occluded hypothetical object given the first trajectory of the occluded hypothetical object; The method can include determining, based on the first trajectory of the occluded hypothetical object and a second trajectory of the AV, a hard brake boundary for the AV, and based on the dissipation boundary and the hard brake boundary, calibrating, by the computer, a speed of the AV.

20 Claims, 6 Drawing Sheets

(51) Int. Cl.
  *B60W 30/14* (2006.01)
  *B60W 50/06* (2006.01)
  *G08G 1/16* (2006.01)
  *B60W 10/04* (2006.01)
  *B60W 10/18* (2012.01)
  *B60W 10/20* (2006.01)

(52) U.S. Cl.
  CPC .......... B60W 30/143 (2013.01); B60W 50/06 (2013.01); G08G 1/166 (2013.01); *B60W 10/04* (2013.01); *B60W 10/18* (2013.01); *B60W 10/20* (2013.01); *B60W 2420/403* (2013.01); *B60W 2420/408* (2024.01); *B60W 2420/54* (2013.01)

(58) Field of Classification Search
  USPC .......................................... 701/25, 1, 70, 93
  See application file for complete search history.

(56) References Cited

U.S. PATENT DOCUMENTS

| | | | |
|---|---|---|---|
| 11,970,164 B1* | 4/2024 | Havlak | B60W 60/00272 |
| 11,983,933 B1* | 5/2024 | Pronovost | G06V 10/764 |
| 2016/0327953 A1 | 1/2016 | Nilsson et al. | |
| 2016/0144838 A1* | 5/2016 | Spencer | B60W 30/0953 701/1 |
| 2017/0297568 A1* | 10/2017 | Kentley | G05D 1/0291 |
| 2020/0086855 A1* | 3/2020 | Packer | G05D 1/0289 |
| 2020/0148201 A1* | 5/2020 | King | B60W 30/0956 |
| 2020/0174481 A1* | 6/2020 | Van Heukelom | G01C 21/3407 |
| 2020/0211394 A1* | 7/2020 | King | G05D 1/0077 |
| 2020/0225669 A1* | 7/2020 | Silva | G01S 17/06 |
| 2020/0278681 A1* | 9/2020 | Gier | G06V 20/56 |
| 2020/0310425 A1* | 10/2020 | Ghose | B60W 30/18163 |
| 2021/0031760 A1 | 2/2021 | Ostafew et al. | |
| 2021/0061269 A1 | 3/2021 | Petroff et al. | |
| 2021/0094539 A1* | 4/2021 | Beller | G05D 1/0214 |
| 2021/0261122 A1* | 8/2021 | Packer | B60W 30/0956 |
| 2022/0144259 A1* | 5/2022 | Hiemer | B60W 30/09 |
| 2022/0185267 A1* | 6/2022 | Beller | B60W 30/0956 |
| 2022/0324484 A1* | 10/2022 | Hruschka | B60W 30/0956 |
| 2023/0073933 A1* | 3/2023 | Mercep | G05B 13/0265 |
| 2024/0182005 A1* | 6/2024 | Goto | B60W 30/18109 |
| 2024/0185434 A1* | 6/2024 | Wyffels | G06V 20/58 |
| 2024/0190452 A1* | 6/2024 | Mirkovic | G06V 20/58 |
| 2024/0227814 A1* | 7/2024 | Rangesh | G06V 20/588 |

OTHER PUBLICATIONS

Ming-Yuan Yu et al., Occlusion-Aware Risk Assessment for Autonomous Driving in Urban Environments, Apr. 2019, IEEE, pp. 2235-2241.*

Rainer Trauth et al., Toward Safer Autonomous Vehicles: Occlusion-Aware Trajectory Planning to Minimize Risky Behavior, Nov. 2023, IEEE, pp. 929-942.*

Chi Zhang et al., Occlusion-Aware Planning for Autonomous Driving With Vehicle-to-Everything Communication, Jan. 2024, IEEE, vol. 9, No. 1, pp. 1229-1242.*

Denggui Wang et al., Occlusion-Aware Motion Planning for Autonomous Driving, Apr. 2023, IEEE Access, pp. 42809-42823.*

M. Sadou et al., Occlusions in Obstacle Detection for Safe Navigation, 2004, IEEE, pp. 716-721.*

Chris van der Ploeg et al., Overcoming Fear of the Unknown: Occlusion-Aware Model-Predictive Planning for Automated Vehicles Using Risk Fields, Sep. 2024, IEEE vol. 25, No. 9, pp. 12591-12604.*

International Search Report and Written Opinion, dated September Oct. 31, 2023, for the corresponding International Application No. PCT/US2023/071504 in 12 pages.

Naumann, et al., Safe but not Overcautious Motion Planning under Occlusions and Limited Sensor Range, dated Jun. 2019, in total 6 pages.

* cited by examiner

SYSTEMS AND TECHNIQUES FOR IMPROVED AUTONOMOUS VEHICLE COMFORT AND OPERATION

BACKGROUND

1. Technical Field

The present disclosure generally relates to improving comfort and operation of autonomous vehicles in environments potentially having occluded objects. For example, aspects of the present disclosure relate to techniques and systems for estimating a trajectory of an occluded hypothetical object in an environment to improve the average speed of an autonomous vehicle in the environment.

2. Introduction

Autonomous vehicles (AVs) are vehicles having computers and control systems that perform driving and navigation tasks that are conventionally performed by a human driver. As AV technologies continue to advance, they will be increasingly used to improve transportation efficiency and safety. As such, AVs will need to perform many of the functions that are conventionally performed by human drivers, such as performing navigation and routing tasks necessary to provide a safe and efficient transportation. Such tasks may require the collection and processing of large quantities of data using various sensor types, including but not limited to cameras and/or Light Detection and Ranging (LiDAR) sensors disposed on the AV.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
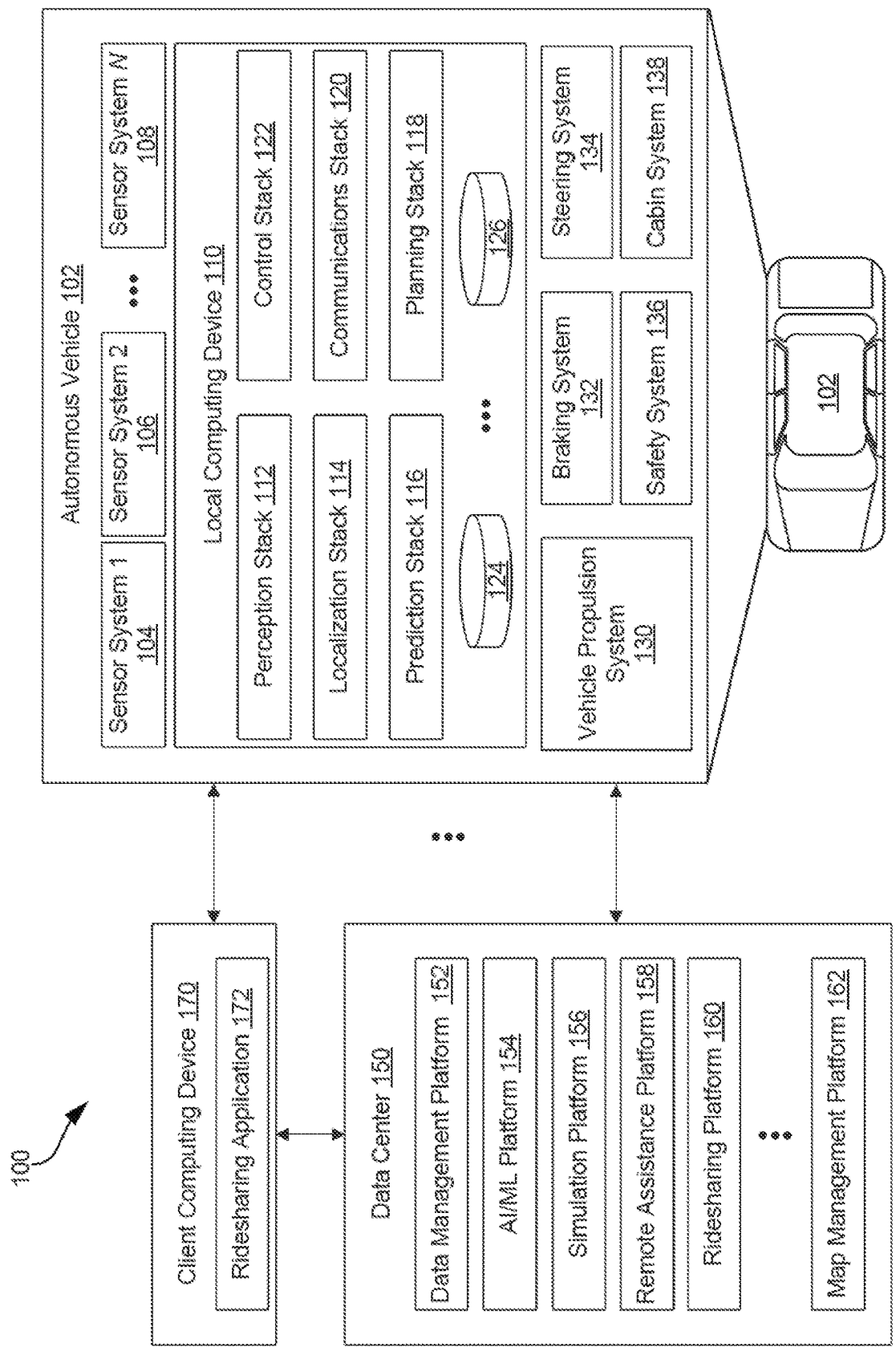
FIG. 1 illustrates an example system environment that can be used to facilitate autonomous vehicle (AV) navigation and routing operations, according to some aspects of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Autonomous vehicles (AVs), also known as self-driving cars, driverless vehicles, and robotic vehicles, are vehicles that use sensors to sense the environment and move without human input. Automation technology enables the AVs to drive on roadways and to perceive the surrounding environment accurately and quickly, including obstacles, signs, and traffic lights. In some cases, AVs can be used to pick up passengers and drive the passengers to selected destinations.

The AVs can include various sensors, such as a camera sensor, a light detection and ranging (LIDAR) sensor, a radio detection and ranging (RADAR) sensor, amongst others, which the AVs can use to collect data and measurements that the AVs use for AV operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system.

Collisions involving at least one vehicle represent a meaningful threat to road users and can be caused by a variety of reasons such as, for example, human error, road conditions, weather conditions, events, etc. Even seasoned and/or defensive drivers can experience vehicle collisions and/or associated risks. Numerous vehicle safety technologies can be implemented by autonomous vehicles and other vehicles to mitigate the risks and/or occurrences of collisions involving at least one vehicle. For example, a vehicle may implement a number of different sensors to detect objects and conditions in a driving environment and trigger actions (e.g., vehicle maneuvers, etc.) to avoid collisions, mitigate the risk of collisions, and/or mitigate the harm of collisions. While vehicle safety technologies can mitigate the risk that a vehicle may be involved in a collision, there are numerous potential risks from third parties such as pedestrians and other road users.

As discussed above, the sensors (e.g., sensor systems 104, 106 and 108 as described in FIG. 1 below) of an AV may enable the AV to sense the surrounding environment and move without human input. For example, if there is a pedestrian in front of the AV, the sensors may inform the AV of the presence of the pedestrian so the AV can react accordingly (e.g., apply brakes and stop or decelerate the vehicle prior to colliding with the pedestrian). In some cases, there may be a scene element (e.g., a pedestrian, an object, an animal, etc.) occluded (e.g., hidden from and/or not detected by the AV's sensor systems) by something in the environment that hides the scene element from the AV and/or restricts an AV from sensing a presence of the scene element. In this example, there is a risk that the scene element may suddenly appear within a trajectory of the AV, from the hidden view or occlusion (e.g., a pedestrian may walk away from behind an occluding object or vehicle and become visible to the AV). In some cases, the AV may not have enough time to react (e.g., apply brakes to stop or decelerate the vehicle) to avoid colliding with the scene element.

In some aspects, the AV may estimate the probability that a scene element may be hidden or occluded from a view of the AV by an object or vehicle, and may limit the speed of the AV such that if a scene element does appear from behind an occlusion there is enough stopping distance and/or time (e.g., from applying a hard brake) to allow the AV to avoid colliding with the pedestrian. The estimation of the probability of a scene element emerging from (e.g., behind, etc.) an occlusion (e.g., an occluding object or vehicle) can be difficult to calculate due in part to the low frequency of such occurrences. In other words, this type of an event can be rare in occurrence and not frequently encountered by an AV.

Described herein are systems, apparatuses, processes (also referred to as methods), and computer-readable media (collectively referred to as "systems and techniques") for improving the operation (e.g., safety, performance, etc.) and comfort of autonomous vehicles. In some cases, the probability of a scene element (e.g., an object, a vehicle, a pedestrian, an animal, etc.) being occluded or hidden from a view of the AV by an occluding object or vehicle may be high (e.g., above a pre-defined threshold). For example, in a crowded environment, there may be a high probability that a scene element is occluded or hidden from a view of the AV by an occluding object or vehicle. In this example, the AV may decelerate to avoid a potential collision with the scene element. In some cases, the probability of a pedestrian behind an occluding object or vehicle may be low (e.g., below a pre-defined threshold). In this example, the AV may maintain its trajectory (e.g., speed) and brake if necessary to avoid a potential collision.

For clarity and explanation purposes, the disclosure may refer to a pedestrian (or hypothetical pedestrian) as an example of a scene element that may be potentially occluded from a view of an AV. However, it should be understood that the systems and techniques described herein can be used in cases involving other types of occluded scene elements such as, for example, an occluded object, an occluded animal, an occluded device or vehicle, an occluded object, and/or any other occluded item. In other words, while various examples described herein may refer to a pedestrian (or hypothetical pedestrian) occluded or hidden from a view of an AV, the pedestrian is merely one non-limiting illustrative example of something that may be occluded or hidden from a view of an AV. Moreover, a hypothetical pedestrian as used herein can refer to something (e.g., a pedestrian or any other scene element as previously noted) that may or may not be present (e.g., behind an occlusion). For example, a hypothetical person that is occluded or hidden from a view of an AV can refer to a pedestrian that may or may not exist and has not been perceived by the AV but is assumed to be present (e.g., behind an occlusion) by the systems and techniques described herein, at least until the AV is able to verify the presence or absence of such a hypothetical pedestrian.

In some examples, the systems and techniques described herein can improve upon relying solely on the probability of a pedestrian being present behind an occluding object (e.g., a building, a vehicle, a device, a structure, etc.) to determine a behavior and/or trajectory (and/or a modification thereof) of the AV (e.g., the AV's speed, acceleration, and deceleration). In some examples, the AV can estimate the trajectory of a hypothetical pedestrian in an occluded environment (e.g., behind an occluding object, vehicle, and/or structure) to improve the average speed, comfort, and safety of an AV. For example, the AV may estimate the trajectory of a hypothetical pedestrian behind an occluding object to determine or predict a dissipation boundary (also referred to herein as a dissipation boundary location). The dissipation boundary refers to a moment in time and space where/when a hypothetical pedestrian occluded from a view of the AV becomes visible to the AV (e.g., is perceived by a perception stack of the AV). In other words, the hypothetical pedestrian is indeed real (e.g., is present) and becomes realized (e.g., perceived) by the AV.

In some aspects, the dissipation boundary may be predicted to occur before a hard brake boundary (also referred to herein as a hard brake boundary location). A hard brake boundary refers to a moment in time and space when the AV should and/or needs to do a hard brake (e.g., apply at least a threshold amount of braking to decelerate) to avoid a collision with the pedestrian (and/or any other objects). In other words, for a given trajectory of the AV, the predicted moment in time and space where the hypothetical pedestrian behind an occluding object becomes visible (e.g., the hypothetical pedestrian becomes realized) occurs prior to the moment in time and space where the AV should or needs to do a hard brake to avoid colliding with the pedestrian. In this example, if the probability of a pedestrian behind an occluding object is low, the AV may avoid or limit deceleration. As a result, the AV's overall average speed (e.g., over the course of a period of time) may increase due to the AV avoiding deceleration.

As noted above, a hard brake as used herein can refer to the act of applying at least a threshold amount of braking. In other words, an act of braking can be considered a hard brake when a magnitude of the braking is at or above a threshold magnitude of braking and/or when a braking amount is estimated to result in at least a threshold amount of deceleration.

In some examples, the dissipation boundary may be predicted to occur after the hard brake boundary. In other words, for a given trajectory of the AV, the predicted moment in time and space where the hypothetical pedestrian behind an occluding object becomes visible (e.g., the hypothetical pedestrian becomes realized by the AV (e.g., is perceived by the AV)) occurs after the moment in time and space where/when the AV should or needs to do a hard brake to avoid colliding with the pedestrian. In this example, the AV may start decelerating earlier before the hard brake boundary in order to avoid potentially hard braking (e.g., applying at least a threshold amount of braking and/or deceleration) to avoid a collision if the hypothetical pedestrian becomes realized by the AV (e.g., is perceived by the AV). In this example the AV may begin braking earlier than the example above where the dissipation boundary is before the hard brake boundary, in order to achieve a lower deceleration.

Examples of the systems and techniques described herein are illustrated in FIG. 1 through FIG. 6 and described below.

FIG. 1 illustrates an example of an AV environment 100. One of ordinary skill in the art will understand that, for the AV environment 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill in the art will appreciate that such variations do not depart from the scope of the present disclosure.

In this example, the AV environment 100 includes an AV 102, a data center (also autonomous vehicle fleet management device, autonomous vehicle fleet management system, management system) 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise inertial measurement units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other examples may include any other number and type of sensors.

The AV 102 can include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth. In some embodiments, an output of the prediction stack 116 can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some embodiments, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the mapping and localization stack 114 and objects identified by the perception stack 112 and predict a future path for the objects. In some embodiments, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, mapping and localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Low Power Wide Area Network (LPWAN), Bluetooth®, infrared, etc.).

The HD geospatial database 126 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal U-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some embodiments, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, a ridesharing platform 160, and a map management platform 162, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform (e.g., map management platform 162); modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some examples, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application 172 to enable passengers to view the AV 102 in transit en route to a pick-up or drop-off location, and so on.

Figure 2:
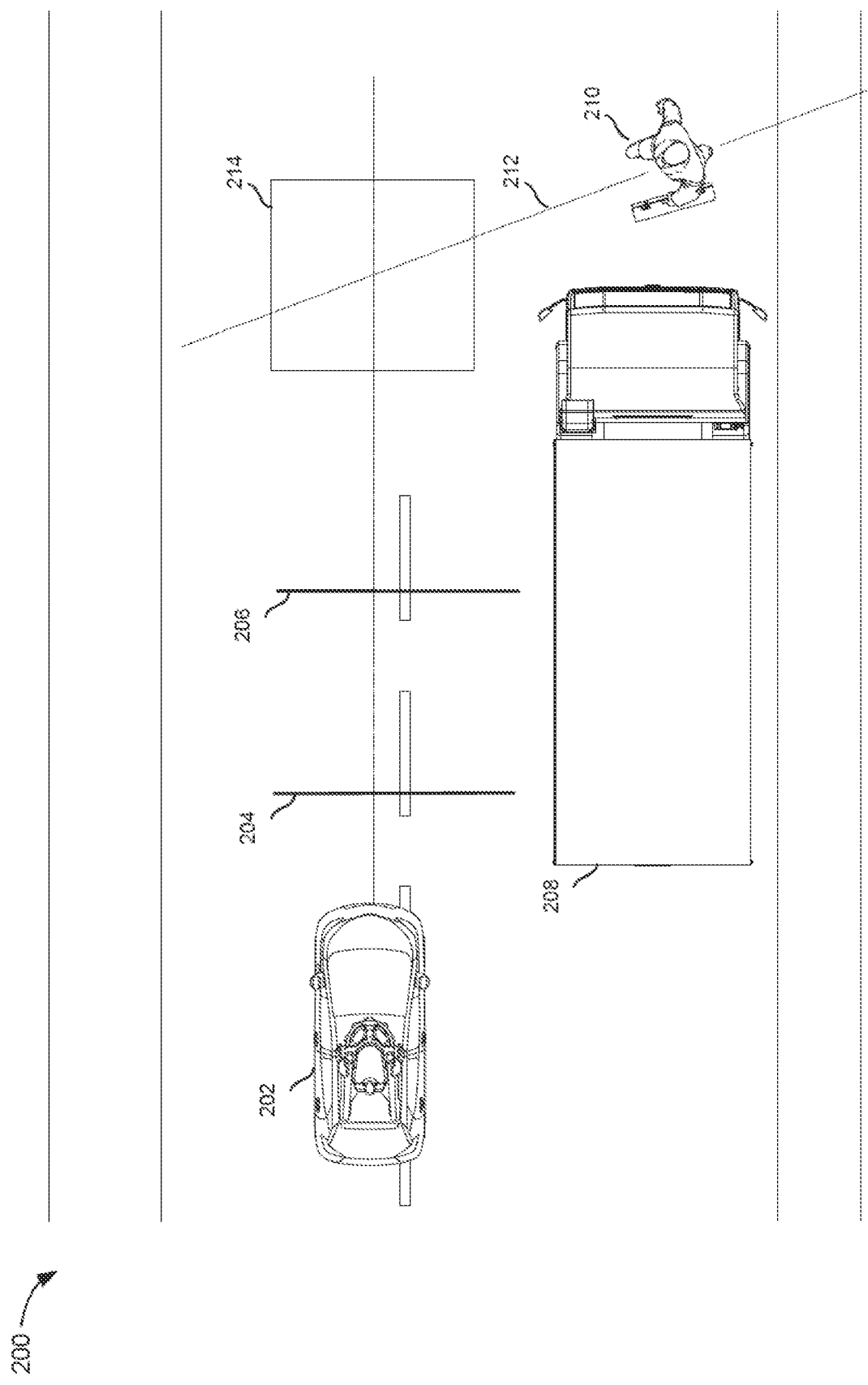
FIG. 2 illustrates an example system for improving comfort and operation of autonomous vehicles in environments having occluded objects, according to some aspects of the present disclosure.

FIG. 2 illustrates an example system 200 for estimating the trajectory of a hypothetical occluded pedestrian to improve the operation, safety, and/or comfort of an AV driving in an environment, according to some aspects of the present disclosure. The system 200 includes AV 202, first boundary 204, second boundary 206, one or more occluding objects (also occlusions) 208, one or more pedestrians 210 (also hypothetical pedestrian, object, hypothetical object, probabilistic object, potential object, occluded hypothetical object), trajectory (also hypothetical trajectory, probable trajectory) 212, and conflict zone 214. The AV 202 can be the same as the AV 102 shown in FIG. 1.

In some cases, system 200 may include an environment with a number of occlusions, such as occluding object 208. The occluding object 208 may include any object that may occlude pedestrian 210 from a view of AV 202 and/or prevent AV 202 from "seeing" (e.g., via perception stack 112) pedestrian 210. In other words, a view of the sensors (e.g., sensor systems 104, 106, 108) of AV 202 to pedestrian 210 may be blocked by occluding object 208 and/or perception stack 112 of the AV 202 may not see through the occluding object 208 (e.g., may not perceive pedestrian 210 through occluding object 208). Since AV 202 (e.g., the perception stack of the AV 202) cannot see through the occluding object 208 (or cannot see through occluding object 208 in a sufficient amount to allow AV 202 to perceive pedestrian 210 behind (e.g., relative to a location of AV 202) occluding object 208), AV 202 may not be able to handle pedestrian 210 hidden behind occluding object 208 (e.g., may not be able to avoid pedestrian 210 and/or adjust an operation of AV 202 to take into account pedestrian 210 before pedestrian 210 is perceived by AV 202).

The occluding object 208 may include any object occluding pedestrian 210 such as, for example and without limitation, a bus, truck, building, structure, vehicle, wall, tree, person, device, sign, and/or any other object. While the system 200 is described with respect to a hypothetical pedestrian (e.g., pedestrian 210), in some examples, the system 200 can be implemented in cases involving other types of hypothetical scene elements (e.g., other than hypothetical pedestrians) such as any object capable of movement including but not limited to humans, animals, machines, and robots, among others. The pedestrian 210 can be considered a hypothetical pedestrian 210 by AV 202 while AV 202 is unable to "see" it (e.g., while the AV 202 is unable to perceive it via a perception stack of AV 202), since AV 202 may not have knowledge or confirmation of the existence of pedestrian 210. In other words, pedestrian 210 can be considered a potential object that may or may not exist (e.g., that may or may not be behind the occluding object 208 relative to a position of the AV 202) while it is occluded behind occluding object 208 from a view of AV 202.

In some aspects, AV 202 may consider or assume the existence of hypothetical pedestrian 210 and determine a trajectory 212 of hypothetical pedestrian 210. The local computing device of AV 202 (e.g., local computing device 110) may determine one or more probable trajectories 212 of pedestrian 210 that includes potential intersections or collisions with AV 202. In some examples, AV 202 may determine the intersection (e.g., collision) of every hypothetical trajectory 212 of hypothetical pedestrian 210 with AV 202 which can result in conflict zone 214. Conflict zone 214 can include a geometric area where every potential collision may occur between AV 202 and hypothetical pedestrian 210 given a trajectory of AV 202.

As shown in FIG. 2, the environment of the AV 202 includes a first boundary 204 and a second boundary 206. In one example scenario, first boundary 204 may be a hard brake boundary and second boundary 206 may be a dissipation boundary. Conversely, in a second example scenario, first boundary 204 may be a dissipation boundary and second boundary 206 may be a hard brake boundary. Both scenarios will be described in further detail in FIG. 3 below. The dissipation boundary can include the moment in space and time where/when the hypothetical pedestrian 210 becomes realized by AV 202 (e.g., hypothetical pedestrian 210 is perceived by AV 202 and is no longer hypothetical). The hard brake boundary can include the moment in space and time where/when AV 202 needs to begin applying hard brakes (e.g., applying at least a threshold amount of brakes and/or decelerating by at least a threshold amount) to avoid a collision with hypothetical pedestrian 210. For potential objects (e.g., hypothetical pedestrian 210) with a low probability of existence (e.g., an area with a low population density), the scenario where the dissipation boundary falls with respect to the hard brake boundary can have implications on the behavior (e.g., trajectory) of AV 202. This will be described in further detail in FIG. 3 below.

Figure 3:
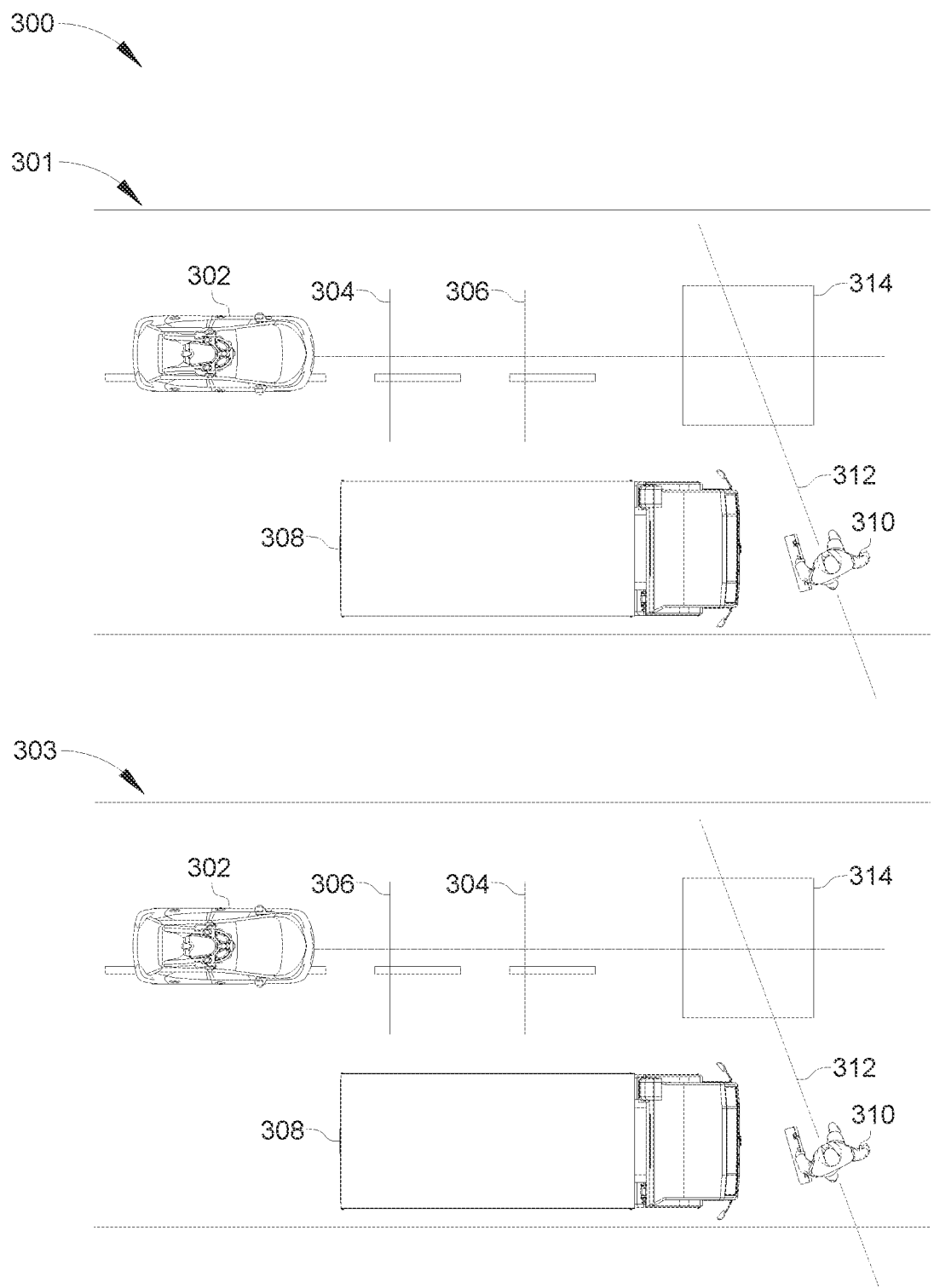
FIG. 3 illustrates another example system for improving comfort and operation of autonomous vehicles in environments having occluded objects, according to some aspects of the present disclosure.

FIG. 3 illustrates another example system 300 for estimating the trajectory of a hypothetical occluded pedestrian to improve an operation, safety, and/or comfort of an AV in an environment, according to some aspects of the present disclosure. The system 300 includes two sample scenarios, scenario 301 and scenario 303. Scenario 301 and scenario 303 include AV 302, dissipation boundary (also predicted dissipation boundary) 304, hard brake boundary (also predicted hard brake boundary) 306, occluding object 308, hypothetical pedestrian 310, trajectory 312 estimated for hypothetical pedestrian 310, and conflict zone 314. As discussed above in FIG. 2, the predicted location of the dissipation boundary (e.g., where the dissipation boundary falls with respect to the hard brake boundary) can have implications on the behavior (e.g., trajectory) of the AV (e.g., AV 302).

In some aspects, if the AV 302 determines (e.g., via local computing device 110) the presence of a hypothetical pedestrian 310 is highly (e.g., within at least a threshold amount) probable/probabilistic including behind occlusions 308, the AV 302 can maintain a speed low enough (e.g., a speed low enough to comfortably break and/or to break in time) to avoid a collision if the hypothetical pedestrian 310 is realized by AV 302 (e.g., perceived by AV 302). For example, the presence of a hypothetical pedestrian 310 may be highly probable in an environment such as a crowded city where there is a higher probability (e.g., higher than in less dense/crowded environments) of pedestrians. In some cases, the systems and techniques described herein may improve the trajectory of AV 302 by considering the predicted location of the dissipation boundary 304 and hard brake boundary 306 for low probability objects, such as hypothetical pedestrian 310. For example, the AV 302 may determine that there's a low probability that hypothetical pedestrian 310 is present in an environment (e.g., and occluded from a view of AV 302) such as, for example and without limitation, a nighttime environment in a deserted city where there are less than a threshold amount of pedestrians present.

In some examples, as illustrated in scenario 301, for low probability objects such as hypothetical pedestrian 310, if predicted dissipation boundary 304 occurs before predicted hard brake boundary 306, AV 302 may avoid deceleration. In some cases, in a situation where AV 302 realizes (e.g., perceives) the hypothetical pedestrian 310 at dissipation boundary 304 (e.g., which occurs before hard brake boundary 306), AV 302 may have time to decelerate in the gap in space between dissipation boundary 304 and hard brake boundary 306, and consequently avoid a hard brake scenario (e.g., avoid applying the brakes by at least a threshold amount) at hard brake boundary 306 (e.g., a hard brake to avoid a collision with hypothetical pedestrian 310). This can benefit AV 302 by increasing the overall average speed of AV 302, improving a comfort of a trip/ride of AV 302, and/or improving a safety of AV 302 by avoiding deceleration and/or hard brake events.

In another example, as illustrated in scenario 303, for low probability objects such as hypothetical pedestrian 310, if predicted dissipation boundary 304 occurs after predicted hard brake boundary 306, AV 302 may calibrate (e.g., adjust) its deceleration (e.g., adjust how much to decrease its speed) depending on the difference between predicted dissipation boundary 304 and predicted hard brake boundary 306. In other words, the distance between hard brake boundary 306 and dissipation boundary 304 impacts the amount of deceleration of AV 302. In some cases, in scenario 303, AV 302 may start decelerating early (e.g., before dissipation boundary 304 and/or hard brake boundary 306) to avoid braking hard (e.g., applying above a threshold amount of brakes/deceleration) at a later point. Since AV 302 will not realize (e.g., perceive) hypothetical pedestrian 310 (e.g., via perception stack 112) before the hard brake boundary 306 (e.g., the location where AV 302 should or needs to do a hard brake to avoid a collision with hypothetical pedestrian 310), then AV 302 may begin braking earlier to get lower deceleration and avoid a potential hard brake.

As discussed above, the behavior of AV 302 differs for low probability objects (e.g., objects having an estimated probability of existing below a threshold) and high probability objects (e.g., objects having an estimated probability of existing above a threshold). In some cases, AV 302 may consider a replan window, $W_{replan}$, (e.g., $W_{replan}$ in Equation (1) below) which can include a window in time and/or space that starts in front of AV 302 (e.g., in front relative to a heading or trajectory of AV 302) and ends at the hypothetical object (e.g., hypothetical pedestrian 310). For example, $W_{replan}$ can be considered as a last time (or substantially near the last time) that AV 302 should or needs to begin reacting (e.g., braking) to avoid colliding with hypothetical pedestrian 310.

To illustrate, the larger the value of $W_{replan}$, the sooner that AV 302 should begin reacting to avoid a collision with a hypothetical object such as hypothetical pedestrian 310. Conversely, the smaller the value of $W_{replan}$ (e.g., the smaller the window size of $W_{replan}$), the later AV 302 may begin braking to avoid colliding with a hypothetical object such as hypothetical pedestrian 310. In some cases, $W_{replan}$ can be considered as a time value that designates how far in advance AV 302 should begin (and/or can begin) braking to avoid colliding with hypothetical object 310.

For example, if the $W_{replan}$ value is 5 seconds (e.g., a 5-second window of time), this means that AV 302 should begin reacting 5 seconds before reaching the hard brake boundary 306 to avoid a potential collision with hypothetical pedestrian 310 (e.g., before an estimated moment in time and space when an estimated trajectory of AV 302 and an estimated trajectory of hypothetical pedestrian 310 are predicted to intersect/collide). In another example, if the $W_{replan}$ value is 2 seconds (e.g., a 2-second window of time), this means that AV 302 should begin reacting 2 seconds before reaching the hard brake boundary 306 to avoid a potential collision with hypothetical pedestrian 310 (e.g., before an estimated moment in time and space when an estimated trajectory of AV 302 and an estimated trajectory of hypothetical pedestrian 310 are predicted to intersect/collide). In some examples, $W_{replan}$ can be calculated based on Equation (1) as follows:

$$W_{replan} = \max(W_{prob}, W_{dissipation}) \quad \text{Equation (1)}$$

In some aspects, $W_{replan}$ is the higher value between $W_{prob}$ as defined in Equation (2) below and $W_{dissipation}$ as defined in Equation (3) below. In other words, $W_{replan}$, which indicates a time window that AV 302 needs to apply breaks to avoid a potential collision with hypothetical pedestrian 310, may be the largest value between $W_{prob}$ and $W_{dissipation}$. According to the relation of Equation (2) below, $W_{prob}$ is dependent on a variable "p" and $W_{min}$ and $W_{max}$. In some aspects, the variable "p" can represent a probability that hypothetical pedestrian 310 exists. In other words, the variable "p" can represent a probability that a hypothetical object (e.g., hypothetical pedestrian 310) which is occluded by an object (e.g., occluding object 308) and has not yet been perceived by AV 302, does indeed exist (and is indeed occluded by the occluding object). Moreover, $W_{min}$ and $W_{max}$ represent the minimum and maximum replan window values, respectively (e.g., $W_{min}$ and $W_{max}$ are two threshold values, usually estimated empirically). For example, $W_{min}$ and $W_{max}$ can represent two threshold values which, in some cases, can be estimated empirically. Example Equation (2) for estimating $W_{prob}$ is provided below:

$$W_{prob} = (1-p)W_{min} + pW_{max} \quad \text{Equation (2)}$$

According to the relation of Equation (3) below, $W_{dissipation}$ depends on variables "C", "D" and "H". In some cases, variable "C" may be the distance from a current position of AV 302 to conflict zone 314. Conflict zone 314 can represent a region in space where AV 302 and hypothetical pedestrian 310 may intersect/collide given one or more potential trajectories of AV 302 and one or more potential trajectories of hypothetical pedestrian 310. In some examples, the variable "D" may be a distance from a position of AV 302 (e.g., from a current position of AV 302 at a time when the variable "D" is calculated) to dissipation boundary 304. In some instances, the variable "H" may be a distance from a position of AV 302 (e.g., from a current position of AV 302 at a time when the variable "H" is calculated) to hard brake boundary 306. The example Equation (3) for calculating $W_{dissipation}$ is provided below:

$$W_{dissipation} = W_{max}\left[1 - \frac{C-D}{C-H}\right] \quad \text{Equation (3)}$$

As discussed above, if $W_{prob}$ is large (or larger than a threshold), then $W_{replan}$ can equate to $W_{prob}$ (e.g., for hypothetical objects having a high estimated probability of existence (e.g., above a threshold), $W_{replan}$ can equate to $W_{prob}$). Conversely, if $W_{prob}$ is small (or smaller than a threshold), then $W_{replan}$ can equate to $W_{dissipation}$ (e.g., for hypothetical objects having a low estimated probability of existence (e.g. below a threshold), $W_{replan}$ can equate to $W_{dissipation}$). Therefore, in environments where there is a low probability (e.g., a probability below a threshold) of existence for hypothetical pedestrian 310, $W_{replan}$ depends on $W_{dissipation}$. In some cases, when $W_{replan}$ equates to $W_{dissipation}$, the time window defined by $W_{replan}$ may allow AV 302 to lower the amount of deceleration and/or number of decelerations, and therefore improve the average speed of AV 302 while maintaining a safety within or above a threshold safety metric.

Figure 4:
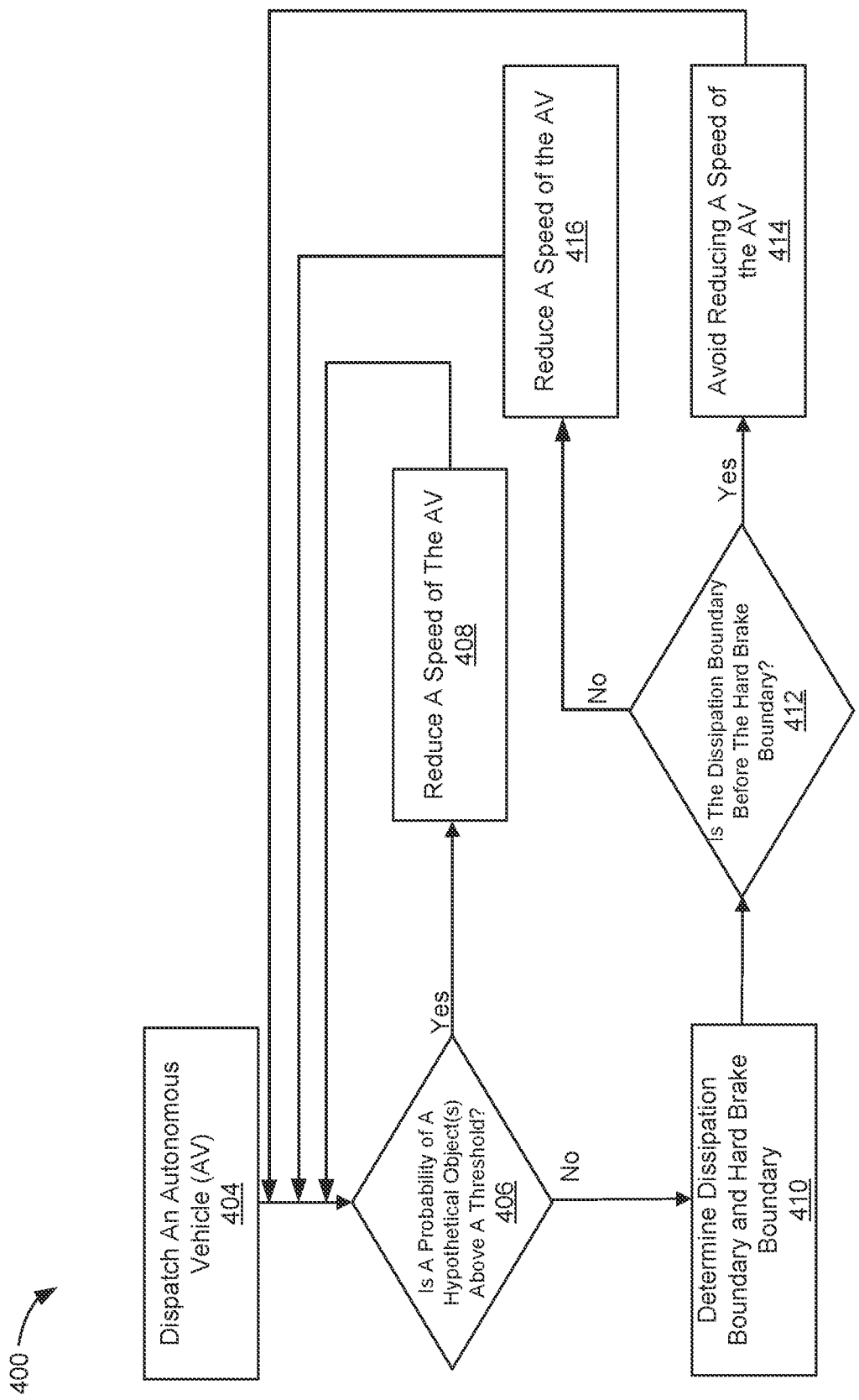
FIG. 4 illustrates an example process for improving comfort and operation of autonomous vehicles in environments having occluded objects, according to some aspects of the present disclosure.

FIG. 4 illustrates an example process 400 for improving an operation, safety, and/or comfort of an AV in an environment with one or more potentially occluded objects (e.g., pedestrians, vehicles, animals, moving objects, etc.), according to some aspects of the present disclosure. At block 404, process 400 may include dispatching an AV (e.g., AV 102, AV 202, or AV 303). Dispatching the AV can include sending the AV to a specific pick-up location associated with a rider/passenger and/or placing the AV in service for responding to ridesharing requests.

At block 406, the process 400 can include determining whether an estimated probability of an existence of a hypothetical object(s) (e.g., hypothetical pedestrian 310) is above a predetermined threshold. In some examples, a computing device (e.g., local computing device 110) of the AV can use data from its sensors (e.g., sensor systems 104, 106, 108) to "see", perceive, and/or understand a surrounding environment/scene of the AV. The computing device of the AV can use the information regarding what the AV "sees", perceives, and/or understands about the surrounding environment/scene of the AV to determine whether an estimated probability of an existence of a hypothetical object(s) in the surrounding environment/scene is above the predetermined threshold. If the estimated probability of an existence of a hypothetical object(s) is above the predetermined threshold, the AV 302 can determine that there is a high probability of the existence of the hypothetical object(s). In other words, the probability can be considered to be high if it exceeds a threshold probability. Similarly, if the estimated probability is below the threshold probability, the probability can be considered to be a low probability as used herein. In some examples, the probability can also be bucketed.

AV 302 may use local computing device 110 and perception stack 112 to determine if there is a high probability (e.g., a probability above a threshold) or low probability (e.g., a probability below a threshold) of an existence of a hypothetical object(s). If the AV determines (e.g., using the local computing device 110 of the AV) that there is a probability above a threshold (e.g., a high probability) that a hypothetical object(s) exists (e.g., is present but occluded from a view of the AV), the process 400 can continue to block 408. At block 408, the process 400 can include reducing a speed of the AV (e.g., applying the brakes and/or otherwise decelerating). For example, if the probability of existence of a hypothetical object(s) is above a threshold (e.g., is high), the AV can decelerate to avoid a potential collision with a hypothetical object, such as hypothetical pedestrian 310.

On the other hand, if the probability of existence of a hypothetical object(s) is below a threshold (e.g., is low), the process 400 can continue to back to block 406 where the AV can continue determining whether a probability of an existence of a hypothetical object(s) is above a threshold (e.g., is high). For example, if the probability of existence of a hypothetical object(s) is below a threshold, the process 400 can continue determining a probability of an existence of a hypothetical object(s) and determining whether such probability is above a threshold probability. Alternatively or additionally, if the AV determines that a probability of an existence of a hypothetical object(s) is not above the threshold probability (e.g., if the AV determines that the probability of an existence of a hypothetical object(s) is low), the process 400 can continue to block 410.

At block 410, the process 400 can include determining a dissipation boundary (e.g., dissipation boundary 304) and a hard brake boundary (e.g., hard brake boundary 306). For example, the AV may use local computing device 110 to determine a dissipation boundary 304 and a hard brake boundary 306.

At block 412, the process 400 can include determining whether the dissipation boundary (e.g., dissipation boundary 304) is before the hard brake boundary (e.g., hard brake boundary 306) relative to a position of the AV. If the dissipation boundary is determined to be before the hard brake boundary relative to a position of the AV, the process 400 can continue to block 414. At block 414, the process 400 can include avoiding reducing a speed of the AV (e.g., avoid deceleration). For example, the AV can avoid reducing its speed (and/or reducing its speed by a threshold amount or more). Thus, since the probability of existence of the hypothetical object(s) was determined to be below the threshold (e.g., a low probability) and the dissipation boundary was determined to be before the hard brake boundary (relative to a position of the AV), the AV can continue driving without decelerating or without decelerating by a threshold amount or more.

In other words, since the AV is predicted/expected to determine (e.g., via perception stack 112 and local computing device 110), at the dissipation boundary (e.g., when the AV reaches the dissipation boundary) and before the hard brake boundary, whether the hypothetical object(s) exists (e.g., is realized/perceived), the AV can have enough time to brake to avoid a collision with the hypothetical object(s), and thus the AV can avoid decelerating (or decelerating by a threshold amount or more) to otherwise avoid the hypothetical object(s). After block 414, the process 400 can continue back to block 406 where the AV may continue determining whether there is a probability above a threshold that a hypothetical object(s) exists but is occluded from a view of/by the AV.

On the other hand, if, at block 412, the AV determines that the dissipation boundary is not before the hard brake boundary relative to a position of the AV (e.g., the dissipation boundary is after the hard brake boundary relative to a position of the AV), the process 400 can continue to block 416. At block 416, the process 400 can include reducing a speed of the AV (e.g., decelerating). In this case, since the AV is predicted/expected to determine, at the dissipation boundary and after the hard brake boundary, whether the hypothetical object(s) exists (e.g., is realized/perceived), the AV may not have enough time to hard brake and avoid a collision with the hypothetical object(s). As discussed above, the hard brake boundary represents the last point in time (or substantially near the last point in time) that the AV can do a hard brake to avoid a collision with the hypothetical object(s). As a result, the AV may need to decelerate early (e.g., before the dissipation boundary) to avoid a potential hard brake (e.g., a braking magnitude above a threshold and/or a deceleration above a threshold based on a certain amount of braking). For example, the AV may need to decelerate before the dissipation boundary and/or the hard break boundary to avoid a potential hard brake.

After block 416, the process 400 can return to block 406 where the AV can continue determining whether there is a probability above a threshold of an existence of a hypothetical object(s). Here, the hypothetical object(s) can be a new or different hypothetical object(s) than the hypothetical object(s) discussed above with respect to blocks 406 through 416.

Figure 5:
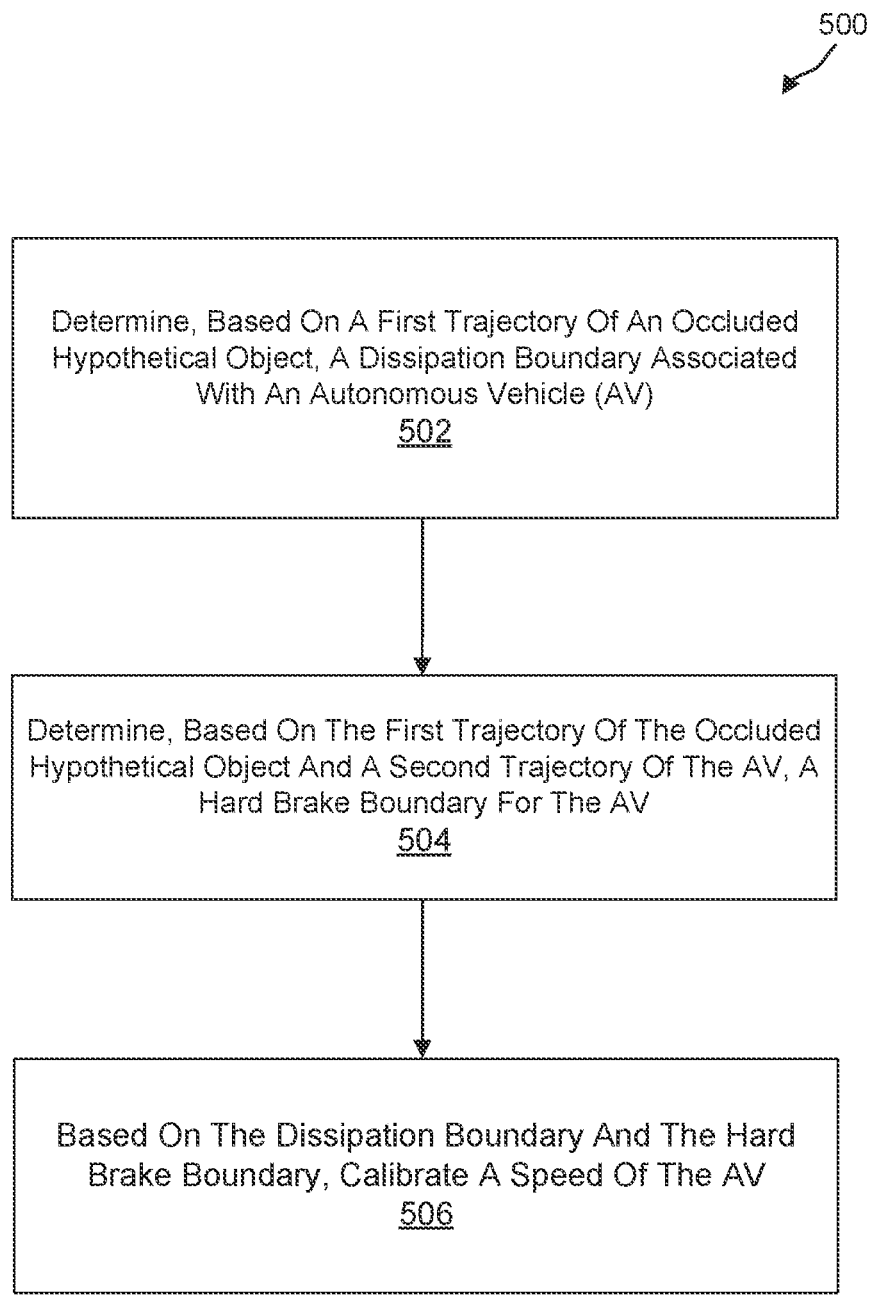
FIG. 5 illustrates another example process for improving comfort and operation of autonomous vehicles in environments having occluded objects, according to some aspects of the present disclosure.

FIG. 5 is a flowchart illustrating another example process 500 for improving an operation, comfort, and/or safety of an AV driving in an environment with one or more potentially occluded objects, according to some aspects of the present disclosure.

At block 502, the process 500 can include determining, based on a first trajectory of an occluded hypothetical object (e.g., hypothetical pedestrian 310), a dissipation boundary (e.g., dissipation boundary 304) associated with an AV (e.g., AV 102, AV 202, AV 302). In some examples, the dissipation boundary includes a location where the AV is predicted to perceive (e.g., realize) the occluded hypothetical object given the first trajectory of the occluded hypothetical object. For example, AV 302 may determine (e.g., via local computing device 110) a dissipation boundary 304 based on the first trajectory (e.g., trajectory 312) of the occluded hypothetical object (e.g., hypothetical pedestrian 310). In some examples, the occluded hypothetical object may be occluded from view of sensors of the AV (e.g., the AV cannot perceive the occluded hypothetical object via a perception stack 112 of a local computing device 110 of the AV). The occluded hypothetical object can be perceived/realized by the AV at the dissipation boundary (e.g., at the dissipation boundary, the AV can perceive/realize the occluded hypothetical object and thus determine that the occluded hypothetical object is no longer hypothetical).

In some examples, the occluded hypothetical object can be occluded from a view of the AV by an object (e.g., a vehicle, an animal, a pedestrian, a moving object, etc.) located within a proximity to the occluded hypothetical object. In some cases, the AV is unable to detect the occluded hypothetical object prior to the dissipation boundary.

At block 504, the process 500 can include determining, based on the first trajectory of the occluded hypothetical object and a second trajectory of the AV, a hard brake boundary (e.g., hard brake boundary 306) for the AV. For example, the AV may determine (e.g., via local computing device 110) a hard brake boundary which may include the last location (or substantially the last location) where the AV should or needs to brake (e.g., decrease velocity, decelerate, brake hard to decelerate or decrease velocity) to avoid a collision with the occluded hypothetical object.

In some examples, the hard brake boundary can include a location where the AV needs to begin decreasing its speed to avoid a collision with the occluded hypothetical object at a location in space where the first trajectory of the occluded hypothetical object and the second trajectory of the AV are predicted to intersect.

At block 506, the process 500 includes calibrating, based on the dissipation boundary and the hard brake boundary, a speed of the AV. In some cases, calibrating the speed of the AV can include reducing a speed of the AV (e.g., decelerating), maintaining a speed of the AV, or foregoing to decrease a speed of the AV. For example, if dissipation boundary is before the hard brake boundary, the AV can avoid decelerating to prevent a collision with the occluded hypothetical object. If a probability of existence of the occluded hypothetical object is low (e.g., below a threshold) and the dissipation boundary is before hard brake boundary, the AV can avoid deceleration (e.g., can forego decreasing its speed). In another example, if the dissipation boundary is after the hard brake boundary, the AV can decelerate (e.g., calibrate its speed by decreasing its speed).

In some examples, the dissipation boundary can be closer to the AV than the hard brake boundary. In such examples, calibrating a speed of the AV can include foregoing reducing a speed of the AV before the hard brake boundary based on a determination that the dissipation boundary is closer to the AV than the hard brake boundary.

In other examples, the hard brake boundary location can be closer to the AV than the dissipation boundary location. In such examples, calibrating a speed of the AV can include decreasing the speed of the AV (e.g., decelerating) before the hard brake boundary based on a determination that the hard brake boundary is closer to the AV than the dissipation boundary.

In some cases, the first trajectory, the second trajectory, the dissipation boundary, and/or the hard brake boundary are estimated based on data from one or more sensors. In some examples, the one or more sensors can include a LIDAR sensor, a RADAR sensor, a camera sensor, an IMU, and/or an acoustic sensor. In some cases, the AV may be unable to detect the occluded hypothetical object prior to the dissipation boundary given a LIDAR coverage of the LIDAR sensor at one or more positions within the second trajectory of the AV, a RADAR coverage of the RADAR sensor at one or more positions within the second trajectory of the AV, and/or a camera sensor coverage of the camera sensor at one or more positions within the second trajectory of the AV.

Figure 6:
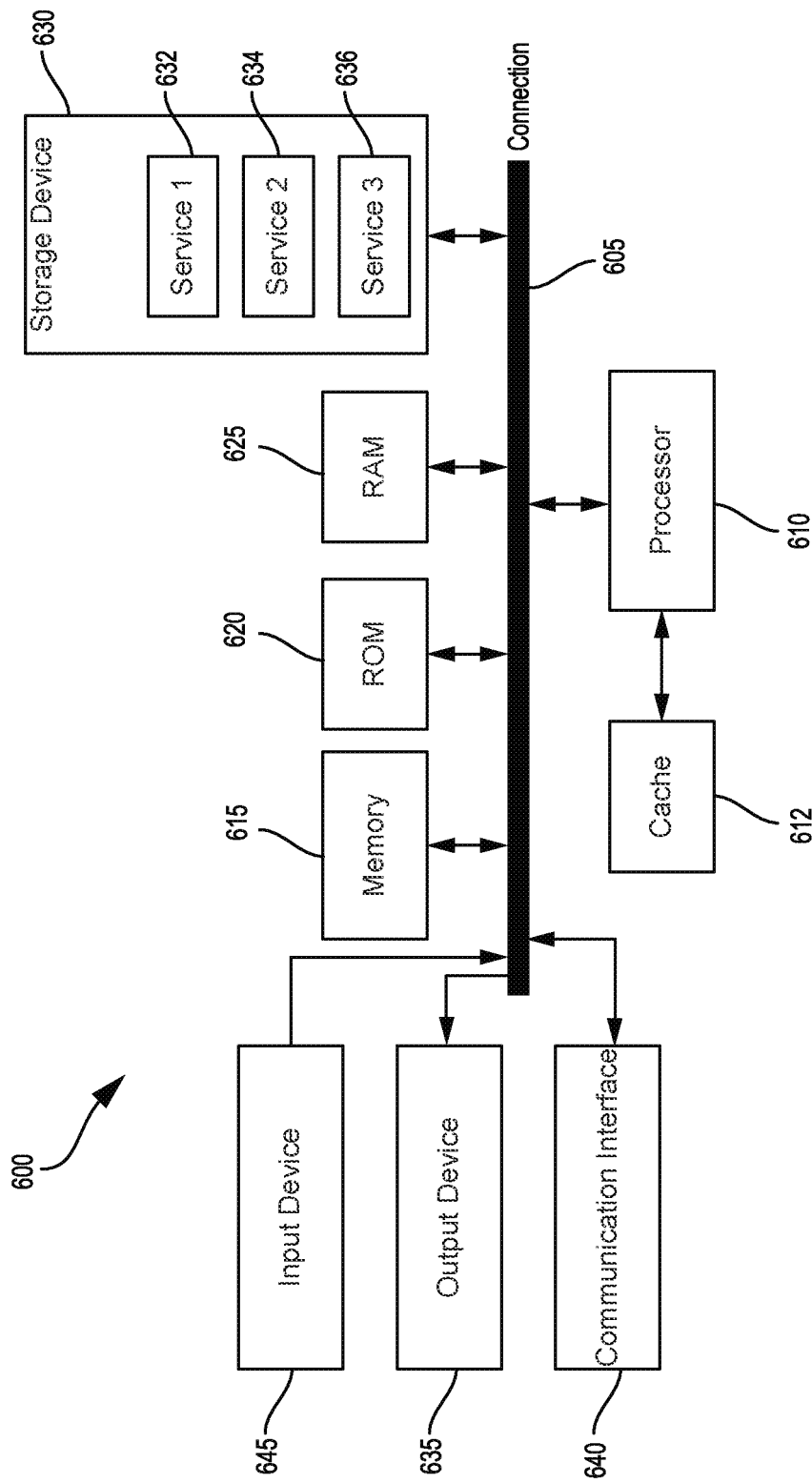
FIG. 6 illustrates an example processor-based system with which some aspects of the subject technology can be implemented, according to some aspects of the present disclosure.

FIG. 6 illustrates an example processor-based system with which some aspects of the subject technology can be implemented. For example, processor-based system 600 can be any computing device making up, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (Central Processing Unit (CPU) or processor) 610 and connection 605 that couples various system components including system memory 615, such as Read-Only Memory (ROM) 620 and Random-Access Memory (RAM) 625 to processor 610. Computing system 600 can include a cache of high-speed memory 612 connected directly with, in close proximity to, or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communications interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be anon-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 630 can include software services, servers, services, etc., that when the code that defines such software is executed by the processor 610, it causes the system 600 to perform a function. In some embodiments, a hardware service that performs a particular function can include the software component stored in a computer-readable medium in connection with the necessary hardware components, such as processor 610, connection 605, output device 635, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various examples and aspects described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include: Aspect 1. A system comprising: at least one memory; and one or more processors coupled to the at least one memory, wherein the one or more processors are configured to: determine, based on a first trajectory of an occluded hypothetical object, a dissipation boundary associated with an autonomous vehicle (AV), wherein the dissipation boundary comprises a location where the AV is predicted to perceive the occluded hypothetical object given the first trajectory of the occluded hypothetical object; determine, based on the first trajectory of the occluded hypothetical object and a second trajectory of the AV, a hard brake boundary for the AV; and based on the dissipation boundary and the hard brake boundary, calibrate a speed of the AV.

Aspect 2. The system of Aspect 1, wherein the occluded hypothetical object is occluded from a view of the AV by an object located within a proximity to the occluded hypothetical object, and wherein the AV is unable to detect the occluded hypothetical object prior to the dissipation boundary.

Aspect 3. The system of Aspect 1 or Aspect 2, wherein the hard brake boundary comprises a location where the AV needs to begin decreasing its speed to avoid a collision with the occluded hypothetical object at a location in space where the first trajectory of the occluded hypothetical object and the second trajectory of the AV are predicted to intersect.

Aspect 4. The system of any of Aspects 1 to 3, wherein the dissipation boundary is closer to the AV than the hard brake boundary, and wherein calibrating the speed of the AV comprises at least one of maintaining the speed of the AV and foregoing decreasing the speed of the AV before the hard brake boundary based on a determination that the dissipation boundary is closer to the AV than the hard brake boundary.

Aspect 5. The system of any of Aspects 1 to 4, wherein the hard brake boundary location is closer to the AV than the dissipation boundary location, and wherein calibrating the speed of the AV can include decreasing the speed of the AV before the hard brake boundary based on a determination that the hard brake boundary is closer to the AV than the dissipation boundary.

Aspect 6. The system of any of Aspects 1 to 5, wherein at least one of the first trajectory, the second trajectory, the dissipation boundary, and the hard brake boundary is estimated based on data from one or more sensors, the one or more sensors comprising at least one of a light detection and ranging (LIDAR) sensor, a radio detection and ranging (RADAR) sensor, a camera sensor, an inertial measurement unit (IMU), and an acoustic sensor.

Aspect 7. The system of Aspect 6, wherein the system comprises the AV, and wherein the AV is unable to detect the occluded hypothetical object prior to the dissipation boundary given at least one of a LIDAR coverage of the LIDAR sensor at one or more positions within the second trajectory of the AV, a RADAR coverage of the RADAR sensor at one or more positions within the second trajectory of the AV, and a camera sensor coverage of the camera sensor at one or more positions within the second trajectory of the AV.

Aspect 8. A method comprising: determining, by a computer of an autonomous vehicle (AV) and based on a first trajectory of an occluded hypothetical object, a dissipation boundary associated with the AV, wherein the dissipation boundary comprises a location where the AV is predicted to perceive the occluded hypothetical object given the first trajectory of the occluded hypothetical object; determining, based on the first trajectory of the occluded hypothetical object and a second trajectory of the AV, a hard brake boundary for the AV; and based on the dissipation boundary and the hard brake boundary, calibrating, by the computer, a speed of the AV.

Aspect 9. The method of Aspect 8, wherein the occluded hypothetical object is occluded from a view of the AV by an object located within a proximity to the occluded hypothetical object, and wherein the AV is unable to detect the occluded hypothetical object prior to the dissipation boundary.

Aspect 10. The method of Aspect 8 or Aspect 9, wherein the hard brake boundary comprises a location where the AV needs to begin decreasing its speed to avoid a collision with the occluded hypothetical object at a location in space where the first trajectory of the occluded hypothetical object and the second trajectory of the AV are predicted to intersect.

Aspect 11. The method of any of Aspects 8 to 10, wherein the dissipation boundary is closer to the AV than the hard brake boundary, and wherein calibrating the speed of the AV comprises at least one of maintaining the speed of the AV and foregoing decreasing the speed of the AV before the hard brake boundary based on a determination that the dissipation boundary is closer to the AV than the hard brake boundary.

Aspect 12. The method of any of Aspects 8 to 11, wherein the hard brake boundary location is closer to the AV than the dissipation boundary location, and wherein calibrating the speed of the AV comprises decreasing the speed of the AV before the hard brake boundary based on a determination that the hard brake boundary is closer to the AV than the dissipation boundary.

Aspect 13. The method of any of Aspects 8 to 12, wherein at least one of the first trajectory, the second trajectory, the dissipation boundary, and the hard brake boundary is estimated based on data from one or more sensors, the one or more sensors comprising at least one of a light detection and ranging (LIDAR) sensor, a radio detection and ranging (RADAR) sensor, a camera sensor, an inertial measurement unit (IMU), and an acoustic sensor.

Aspect 14. The method of Aspect 13, wherein the AV is unable to detect the occluded hypothetical object prior to the dissipation boundary given at least one of a LIDAR coverage of the LIDAR sensor at one or more positions within the second trajectory of the AV, a RADAR coverage of the RADAR sensor at one or more positions within the second trajectory of the AV, and a camera sensor coverage of the camera sensor at one or more positions within the second trajectory of the AV.

Aspect 15. A non-transitory computer-readable storage medium comprising instructions which, when executed by one or more processors, cause the one or more processors to perform a method according to any of Aspects 8 to 14.

Aspect 16. A computer program product comprising instructions which, when executed by one or more processors, cause the one or more processors to perform a method according to any of Aspects 8 to 14.

Aspect 17. An autonomous vehicle comprising a computer device having stored thereon instructions which, when executed by the computer device, cause the computer device to perform a method according to any of Aspects 8 to 14.

What is claimed is:
1. A system comprising:
at least one memory; and
one or more processors coupled to the at least one memory, wherein the one or more processors are configured to:
determine, based on a first trajectory of an occluded hypothetical object, a dissipation boundary associated with an autonomous vehicle (AV), wherein the dissipation boundary comprises a location where the AV is predicted to perceive the occluded hypothetical object given the first trajectory of the occluded hypothetical object;
determine, based on the first trajectory of the occluded hypothetical object and a second trajectory of the AV, a hard brake boundary for the AV, the hard brake boundary indicating where the AV needs to have a decreased speed to avoid a collision with the occluded hypothetical object;
determine a time window having a duration based on a distance between the AV and the occluded hypothetical object, the duration based on a probability that the occluded hypothetical object exists; and based on the dissipation boundary and the hard brake boundary, calibrate a speed of the AV, wherein the speed is calibrated so that the AV begins to decelerate at a selected time prior to reaching the hard brake boundary, the selected time based on the time window.

2. The system of claim 1, wherein the occluded hypothetical object is occluded from a view of the AV by an object located within a proximity to the occluded hypothetical object, and wherein the AV is unable to detect the occluded hypothetical object prior to the dissipation boundary.

3. The system of claim 1, wherein the hard brake boundary comprises a location where the AV needs to begin decreasing its speed to avoid a collision with the occluded hypothetical object at a location in space where the first trajectory of the occluded hypothetical object and the second trajectory of the AV are predicted to intersect.

4. The system of claim 1, wherein the dissipation boundary is closer to the AV than the hard brake boundary, and wherein calibrating the speed of the AV comprises at least one of maintaining the speed of the AV and foregoing decreasing the speed of the AV before the hard brake boundary based on a determination that the dissipation boundary is closer to the AV than the hard brake boundary.

5. The system of claim 1, wherein the hard brake boundary location is closer to the AV than the dissipation boundary location, and wherein calibrating the speed of the AV can include decreasing the speed of the AV before the hard brake boundary based on a determination that the hard brake boundary is closer to the AV than the dissipation boundary.

6. The system of claim 1, wherein at least one of the first trajectory, the second trajectory, the dissipation boundary, and the hard brake boundary is estimated based on data from one or more sensors, the one or more sensors comprising at least one of a light detection and ranging (LIDAR) sensor, a radio detection and ranging (RADAR) sensor, a camera sensor, an inertial measurement unit (IMU), and an acoustic sensor.

7. The system of claim 6, wherein the system comprises the AV, and wherein the AV is unable to detect the occluded hypothetical object prior to the dissipation boundary given at least one of a LIDAR coverage of the LIDAR sensor at one or more positions within the second trajectory of the AV, a RADAR coverage of the RADAR sensor at one or more positions within the second trajectory of the AV, and a camera sensor coverage of the camera sensor at one or more positions within the second trajectory of the AV.

8. A method comprising:
determining, by a computer of an autonomous vehicle (AV) and based on a first trajectory of an occluded hypothetical object, a dissipation boundary associated with the AV, wherein the dissipation boundary comprises a location where the AV is predicted to perceive the occluded hypothetical object given the first trajectory of the occluded hypothetical object;
determining, based on the first trajectory of the occluded hypothetical object and a second trajectory of the AV, a hard brake boundary for the AV, the hard brake boundary indicating where the AV needs to have a decreased speed to avoid a collision with the occluded hypothetical object;
determining a time window having a duration based on a distance between the AV and the occluded hypothetical object, the duration based on a probability that the occluded hypothetical object exists; and
based on the dissipation boundary and the hard brake boundary, calibrating, by the computer, a speed of the AV, wherein the speed is calibrated so that the AV begins to decelerate at a selected time prior to reaching the hard brake boundary, the selected time based on the time window.

9. The method of claim 8, wherein the occluded hypothetical object is occluded from a view of the AV by an object located within a proximity to the occluded hypothetical object, and wherein the AV is unable to detect the occluded hypothetical object prior to the dissipation boundary.

10. The method of claim 8, wherein the hard brake boundary comprises a location where the AV needs to begin decreasing its speed to avoid a collision with the occluded hypothetical object at a location in space where the first trajectory of the occluded hypothetical object and the second trajectory of the AV are predicted to intersect.

11. The method of claim 8, wherein the dissipation boundary is closer to the AV than the hard brake boundary, and wherein calibrating the speed of the AV comprises at least one of maintaining the speed of the AV and foregoing decreasing the speed of the AV before the hard brake boundary based on a determination that the dissipation boundary is closer to the AV than the hard brake boundary.

12. The method of claim 8, wherein the hard brake boundary location is closer to the AV than the dissipation boundary location, and wherein calibrating the speed of the AV comprises decreasing the speed of the AV before the hard brake boundary based on a determination that the hard brake boundary is closer to the AV than the dissipation boundary.

13. The method of claim 8, wherein at least one of the first trajectory, the second trajectory, the dissipation boundary, and the hard brake boundary is estimated based on data from one or more sensors, the one or more sensors comprising at least one of a light detection and ranging (LIDAR) sensor, a radio detection and ranging (RADAR) sensor, a camera sensor, an inertial measurement unit (IMU), and an acoustic sensor.

14. The method of claim 13, wherein the AV is unable to detect the occluded hypothetical object prior to the dissipation boundary given at least one of a LIDAR coverage of the LIDAR sensor at one or more positions within the second trajectory of the AV, a RADAR coverage of the RADAR sensor at one or more positions within the second trajectory of the AV, and a camera sensor coverage of the camera sensor at one or more positions within the second trajectory of the AV.

15. A non-transitory computer-readable storage medium comprising instructions which, when executed by one or more processors, cause the one or more processors to:
determine, based on a first trajectory of an occluded hypothetical object, a dissipation boundary associated with an autonomous vehicle (AV), wherein the dissipation boundary comprises a location where the AV is predicted to perceive the occluded hypothetical object given the first trajectory of the occluded hypothetical object;
determine, based on the first trajectory of the occluded hypothetical object and a second trajectory of the AV, a hard brake boundary for the AV, the hard brake boundary indicating where the AV needs to have a decreased speed to avoid a collision with the occluded hypothetical object;
determine a time window having a duration based on a distance between the AV and the occluded hypothetical object, the duration based on a probability that the occluded hypothetical object exists; and based on the dissipation boundary and the hard brake boundary, calibrate a speed of the AV, wherein the speed is calibrated so that the AV begins to decelerate at a selected time prior to reaching the hard brake boundary, the selected time based on the time window.

16. The non-transitory computer-readable storage medium of claim 15, wherein the occluded hypothetical object is occluded from a view of the AV by an object located within a proximity to the occluded hypothetical object, and wherein the AV is unable to detect the occluded hypothetical object prior to the dissipation boundary.

17. The non-transitory computer-readable storage medium of claim 15, wherein the hard brake boundary comprises a location where the AV needs to begin decreasing its speed to avoid a collision with the occluded hypothetical object at a location in space where the first trajectory of the occluded hypothetical object and the second trajectory of the AV are predicted to intersect.

18. The non-transitory computer-readable storage medium of claim 15, wherein the dissipation boundary is closer to the AV than the hard brake boundary, and wherein calibrating the speed of the AV comprises at least one of maintaining the speed of the AV and foregoing decreasing the speed of the AV before the hard brake boundary based on a determination that the dissipation boundary is closer to the AV than the hard brake boundary.

19. The non-transitory computer-readable storage medium of claim 15, wherein the hard brake boundary location is closer to the AV than the dissipation boundary location, and wherein calibrating the speed of the AV comprises decreasing the speed of the AV before the hard brake boundary based on a determination that the hard brake boundary is closer to the AV than the dissipation boundary.

20. The non-transitory computer-readable storage medium of claim 15, wherein at least one of the first trajectory, the second trajectory, the dissipation boundary, and the hard brake boundary is estimated based on data from one or more sensors, the one or more sensors comprising at least one of a light detection and ranging (LIDAR) sensor, a radio detection and ranging (RADAR) sensor, a camera sensor, an inertial measurement unit (IMU), and an acoustic sensor.

* * * * *